(12) United States Patent
Janik et al.

(10) Patent No.: US 6,504,672 B1
(45) Date of Patent: Jan. 7, 2003

(54) HOUSING COVER WITH SPINDLE CAP

(75) Inventors: Peter R. Janik, Shakopee; David D. Koester, Chanhassen; Stephen P. LeClair, Burnsville, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/465,956

(22) Filed: Dec. 17, 1999

Related U.S. Application Data

(60) Provisional application No. 60/133,020, filed on May 7, 1999.

(51) Int. Cl.⁷ .............................................. G11B 33/14
(52) U.S. Cl. .................................................. 360/97.02
(58) Field of Search ........................... 360/97.02, 97.01, 360/98.01, 98.07, 99.08; 369/263; 310/67 R, 51; 361/685

(56) References Cited

U.S. PATENT DOCUMENTS

| | | | |
|---|---|---|---|
| 4,677,509 A | * 6/1987 | Nishida et al. | 360/98.07 |
| 4,739,425 A | * 4/1988 | Dierkes et al. | 360/98.08 |
| 4,855,857 A | 8/1989 | Ono et al. | 360/133 |
| 4,899,237 A | * 2/1990 | Tochiyama et al. | 360/98.02 |
| 5,214,549 A | 5/1993 | Baker et al. | 360/97.02 |
| 5,282,100 A | 1/1994 | Tacklind et al. | 360/97.02 |
| 5,430,589 A | 7/1995 | Moir et al. | 360/97.02 |
| 5,483,397 A | 1/1996 | Gifford et al. | 360/97.01 |
| 5,517,375 A | 5/1996 | Dion et al. | 360/98.07 |
| 5,666,239 A | 9/1997 | Pottebaum | 360/97.03 |
| 5,751,080 A | * 5/1998 | Hong | 310/67 R |
| 5,757,580 A | 5/1998 | Andress et al. | 360/97.02 |
| 5,781,373 A | 7/1998 | Larson et al. | 360/97.02 |
| 5,875,067 A | 2/1999 | Morris et al. | 360/97.01 |
| 5,920,443 A | 7/1999 | Ekhoff | 360/99.08 |
| 6,212,029 B1 | * 4/2001 | Fioravanti | 360/97.01 |
| 6,212,030 B1 | * 4/2001 | Koriyama et al. | 360/98.08 |
| 6,256,165 B1 | * 7/2001 | Kim | 360/97.01 |

* cited by examiner

*Primary Examiner*—David Hudspeth
*Assistant Examiner*—Angel Castro
(74) *Attorney, Agent, or Firm*—Westman, Champlin & Kelly, P.A.

(57) ABSTRACT

A housing structure for a disc drive including a rigid housing having opposed inner and outer surfaces and a spindle opening. A spindle cap is sized to fit in the spindle opening and includes opposed inner and outer surfaces. The inner surface of the spindle cap is raised above or spaced from the inner surface of the rigid housing for spindle clearance.

19 Claims, 6 Drawing Sheets

HOUSING COVER WITH SPINDLE CAP

CROSS REFERENCE TO RELATED APPLICATIONS

The application claims priority to Provisional Application Ser. No. 60/133,020 filed on May 7, 1999 and entitled "DML COVER SPINDLE ADAPTER".

FIELD OF THE INVENTION

The present invention relates to a data storage device. In particular, the present invention relates to a housing structure for a data storage device.

BACKGROUND OF THE INVENTION

Disc drives are used to store digitally encoded information and include a disc stack for encoding information and a head stack assembly supporting transducer elements for reading and/or writing data to the discs in the disc stack. Disc stacks include a plurality of discs which are supported for co-rotation by a spindle motor. Head stack assembly is rotated by a voice coil motor to position heads relative to selected data tracks for read and write operations Components of the disc drive including the spindle motor and head stack assembly are supported within a housing structure including a base chassis and cover. The spindle motor and head stack assembly are secured relative to the base chassis and cover to limit vibrational movement of the spindle motor and head stack assembly for consistent head placement. The dimensions of the housing of the disc drive are controlled by form factor dimensions. Spindle motor dimensions and the dimensions of the housing assembly contribute to form factor height dimensions.

Drive capacity is related to the number of discs supported by the spindle motor. The number of discs supported by the spindle motor increases the height dimension of the spindle motor. Adequate spindle clearance between the spindle motor and housing is necessary for rotation of the discs supported by the spindle motor. Thicker housing components reduce allowable spindle height and spindle clearance for form factor dimensions. In particular, composite cover constructions including a dampening layer for dissipating vibrational motion increase cover dimensions which interferes with or diminishes space available for spindle height and spindle clearance. The present invention addresses these and other problems, and offers other advantages over the prior art.

SUMMARY OF THE INVENTION

The present invention relates to a housing structure for a disc drive including a rigid housing having opposed inner and outer surfaces and a spindle opening. A spindle cap is sized to fit in the spindle opening and includes opposed inner and outer surfaces. The inner surface of the spindle cap is raised above or spaced from the inner surface of the rigid housing for spindle clearance.

DETAILED DESCRIPTION OF THE ILLUSTRATIVE EMBODIMENTS

Figure 1:
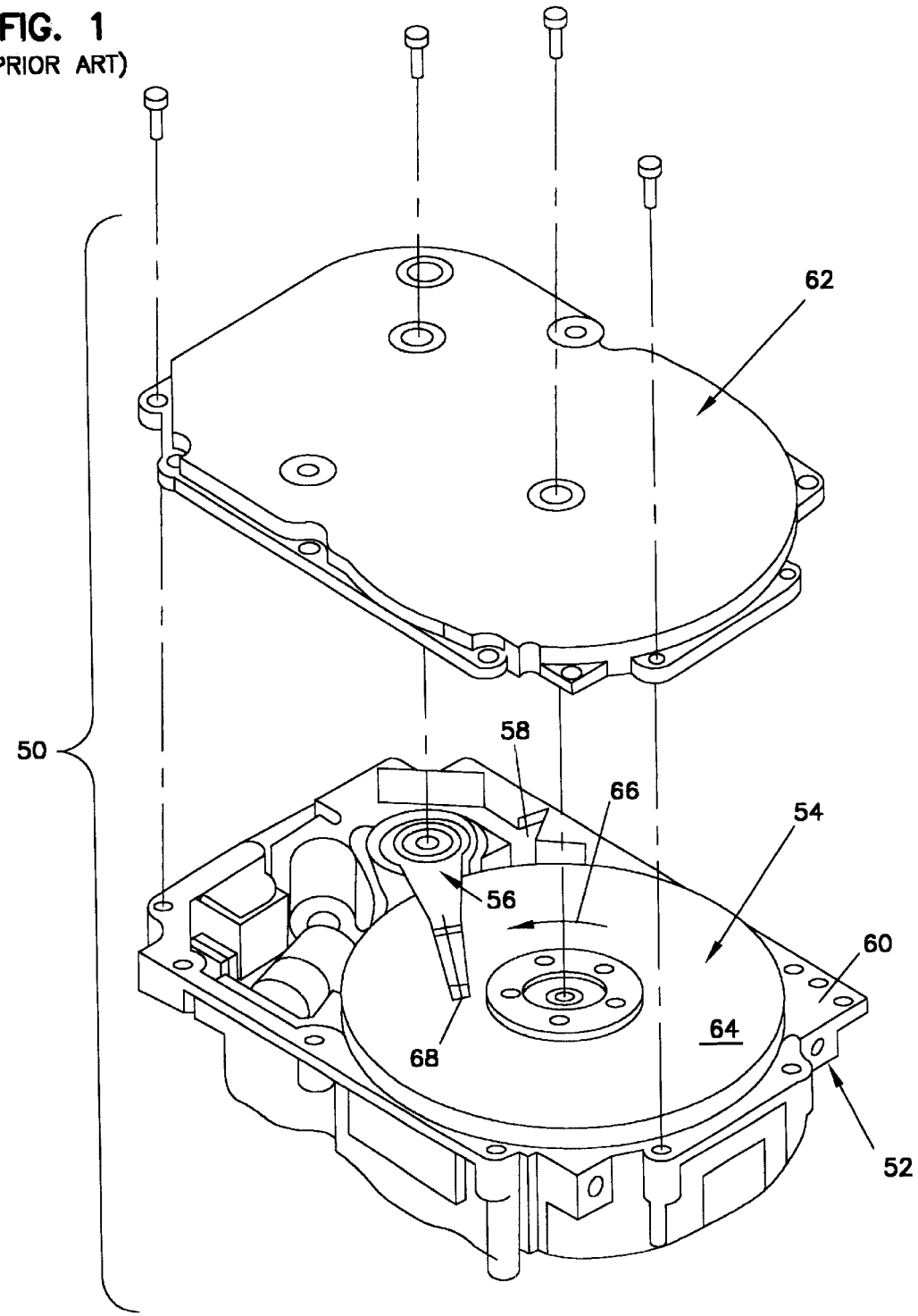
FIG. 1 is a perspective view of an embodiment of a disc drive with a cover shown exploded from a base chassis of the disc drive.

FIG. 1. illustrates a disc drive 50 including a base chassis 52, disc stack 54 and a head stack assembly 56. In the embodiment shown, base chassis 52 includes a central cavity 58 and a raised deck 60. Operating components, including the disc stack 54 and head stack assembly 56 are supported in cavity 58. Cavity 58 is closed by cover 62 secured to deck 60 of the base chassis 52. Disc stack 54 includes a plurality of discs 64 rotationally coupled to base chassis 52 in cavity 58 for rotation, as illustrated by arrow 66. The head stack assembly 56 is rotationally coupled to base chassis 52 in cavity 58 to support heads 68 for reading and/or writing data to and from discs 64 via operation of a voice coil motor ("VCM").

Figure 2:
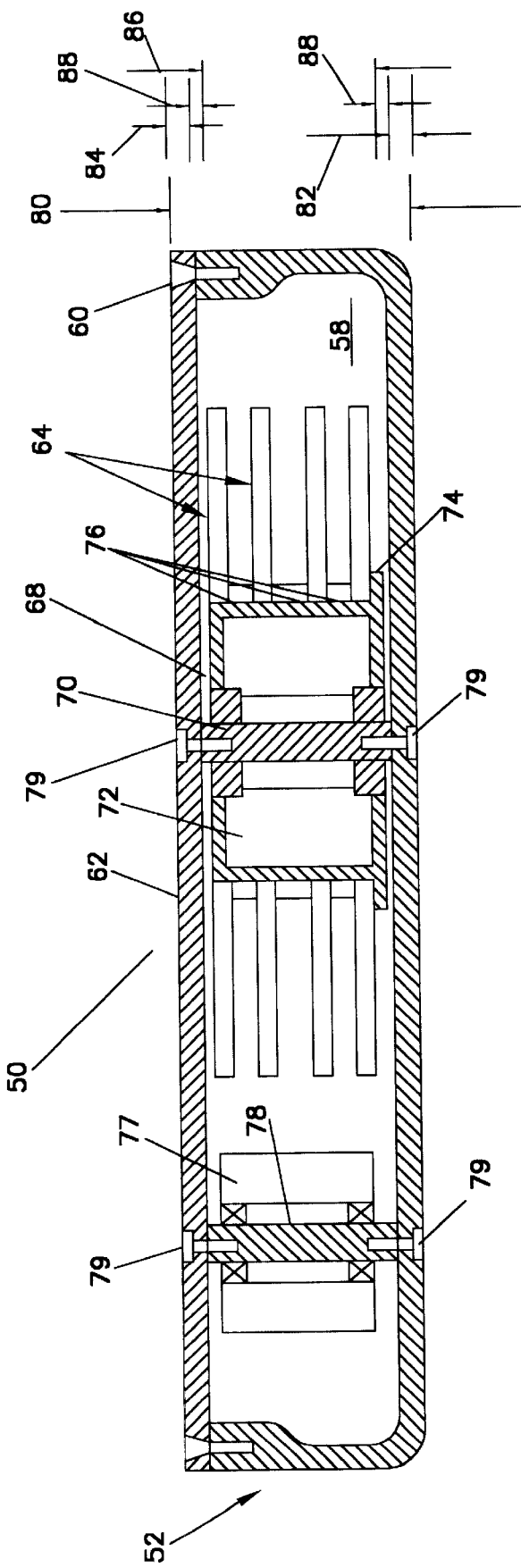
FIG. 2 is a cross-sectional view of an embodiment of a disc drive illustrating a spindle motor and head stack assembly secured between a cover and base chassis.

FIG. 2 is a diagrammatic cross-sectional view of disc drive 50. As shown in FIG. 2, discs 64 are supported for rotation relative to the base chassis 52 via a spindle motor 68 (illustrated diagrammatically). Spindle motor 68 includes a spindle hub 70 rigidly supported between chassis 52 and cover 62 and a spindle 72 rotationally coupled to hub 70. Discs 64 are supported for rotation with spindle 72 on rim 74. Discs 64 are stacked on rim 74 and are separated by spacers 76 Head stack assembly 56 is supported in cavity 58 and includes an actuator block 77 (illustrated diagrammatically) rotationally coupled to actuator shaft 78 rigidly supported between chassis 52 and cover 62. The spindle hub 70 and actuator shaft 78 are rigidly connected to base chassis 52 and cover 62 to limit vibration via fasteners 79 extending through fastener openings in the base chassis 52 and cover 62.

As shown in FIG. 2, the overall drive height 80 of the disc drive is sized to conform to form factor dimensions. The thickness of the base chassis 82 and cover 84, the height of the spindle motor 86 and spindle clearance 88 contribute to the cumulative form factor dimension 80. Drive capacity is related inter alia to the number of discs supported by the spindle motor 68. Spindle height is a function of the number of discs supported in a disc stack and is limited by the form factor dimension 80. As previously explained, the height of the spindle motor 68 contributes to the limited form factor height of the disc drive and cover constructions having a relatively thick dimension limit available height for the spindle motor and spindle clearance.

Figure 3:
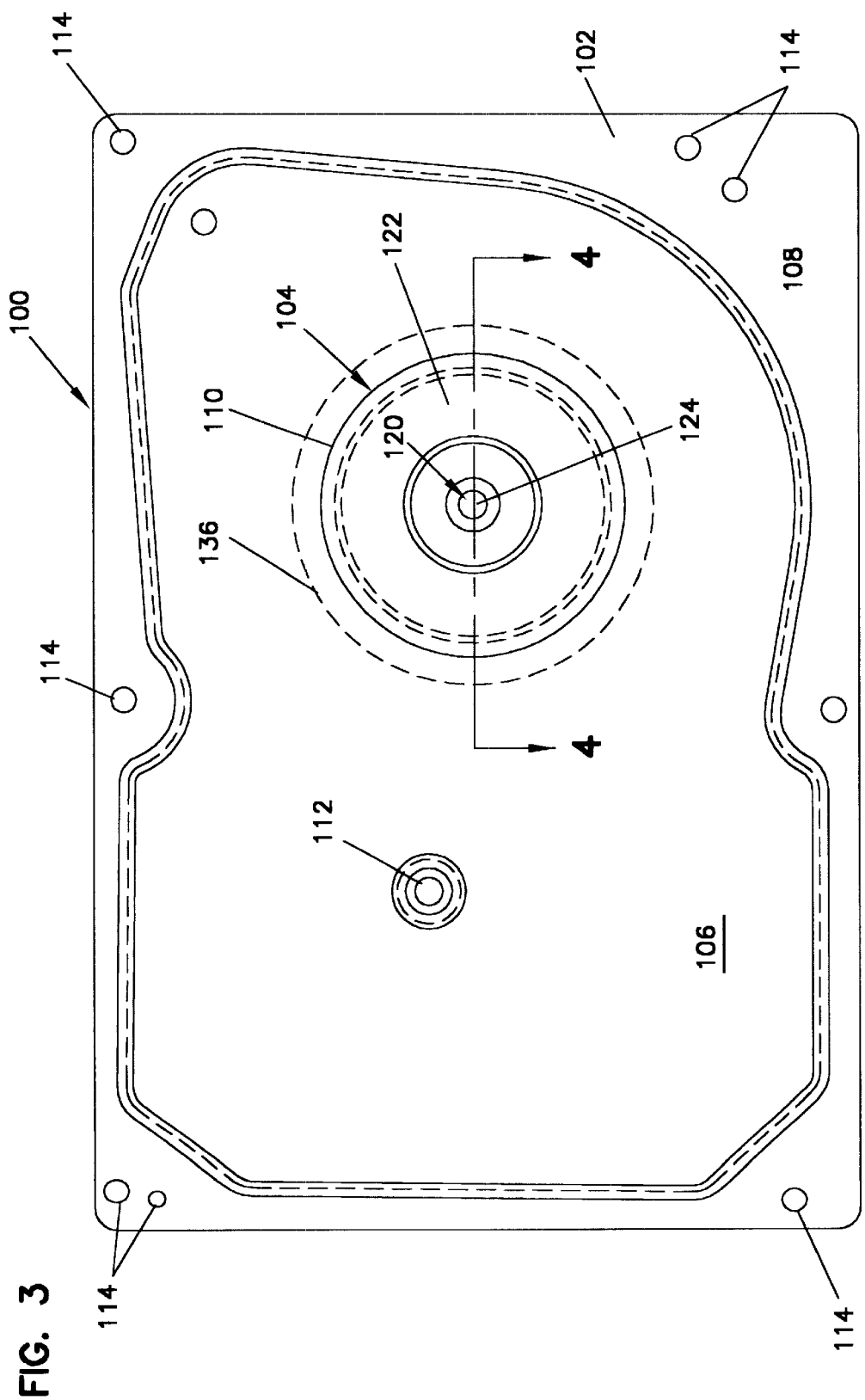
FIG. 3 is a top elevational view of an embodiment of a cover including a cover plate and spindle cap according to the present invention.
Figure 4:
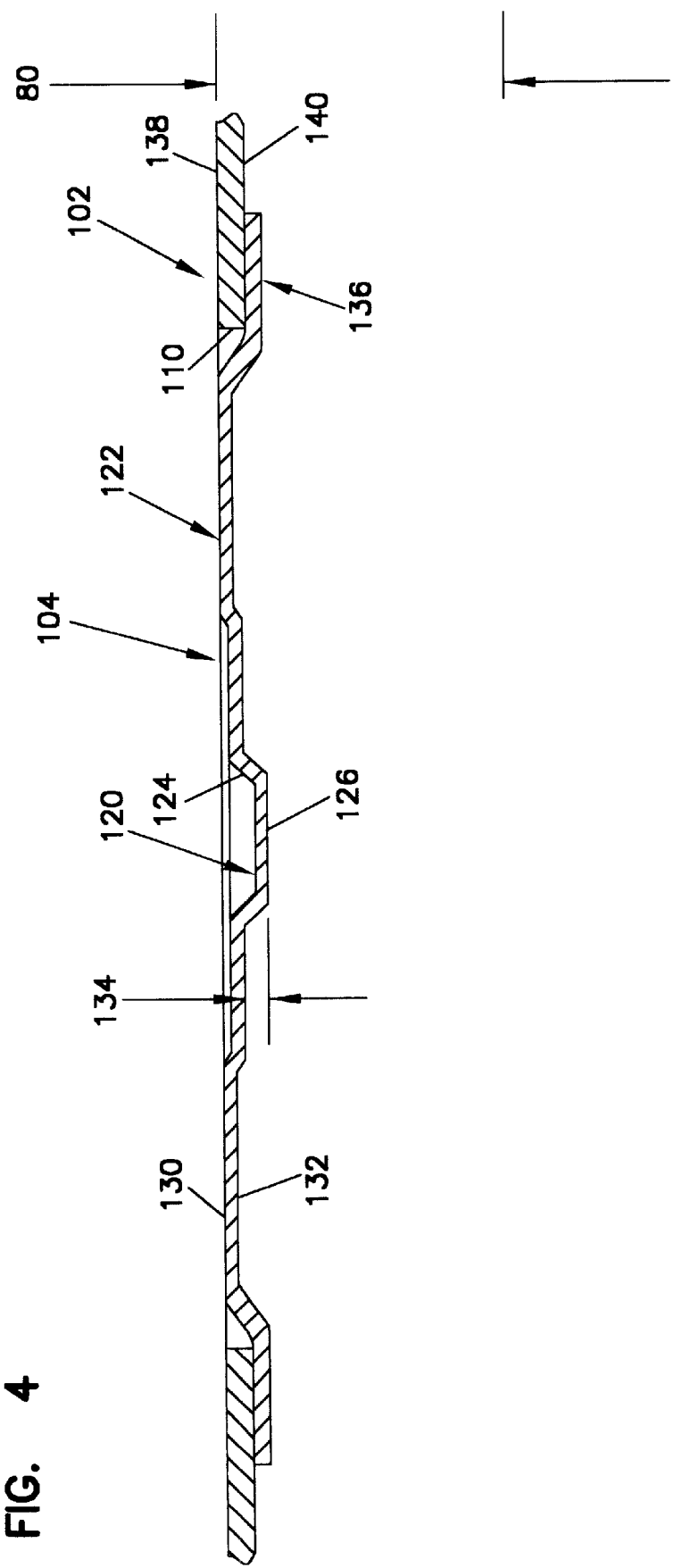
FIG. 4 is a cross-sectional view of the cover of FIG. 3 illustrating cover plate and spindle cap.

FIGS. 3–4 illustrate an embodiment of a cover 100 construction according to the present invention including a spindle adapter for optimizing spindle height, cover thickness and spindle clearance for form factor dimensions. As shown in FIGS. 3–4, cover 100 includes a cover plate 102 and a spindle cap 104. Cover plate 102 includes a main body portion 106, a rim 108, a spindle cap opening 110 and a head stack fastener opening 112. Spindle cap 104 is supported in spindle opening 110 to close spindle opening 110. Rim 108 includes a plurality of fastener openings 114 to secure cover 100 to deck 60 of base chassis 52. The dimensions of spindle cap 104 are designed to fit within the form factor dimensions while providing sufficient clearance between rotating discs and the cover as will be explained.

In the embodiment shown in FIG. 4, spindle cap 104 includes hub portion 120 and a spindle portion 122. The hub portion 120 includes a countersunk fastener hole 124 and a lower hub surface 126 designed to abut against spindle hub 70 to secure spindle hub to limit vibration and movement of the disc stack. A fastener (not shown) extends through hole 124 to secure spindle hub 70 to cover 100. Spindle portion 122 includes an outer surface 130 and an inner surface 132. Inner surface 132 is recessed for sufficient spindle clearance as illustrated by line 134. As shown, an outer rim 136 extends about the perimeter of spindle portion 122 to secure the spindle cap 104 in spindle cap opening 110 for operation.

Figure 5:
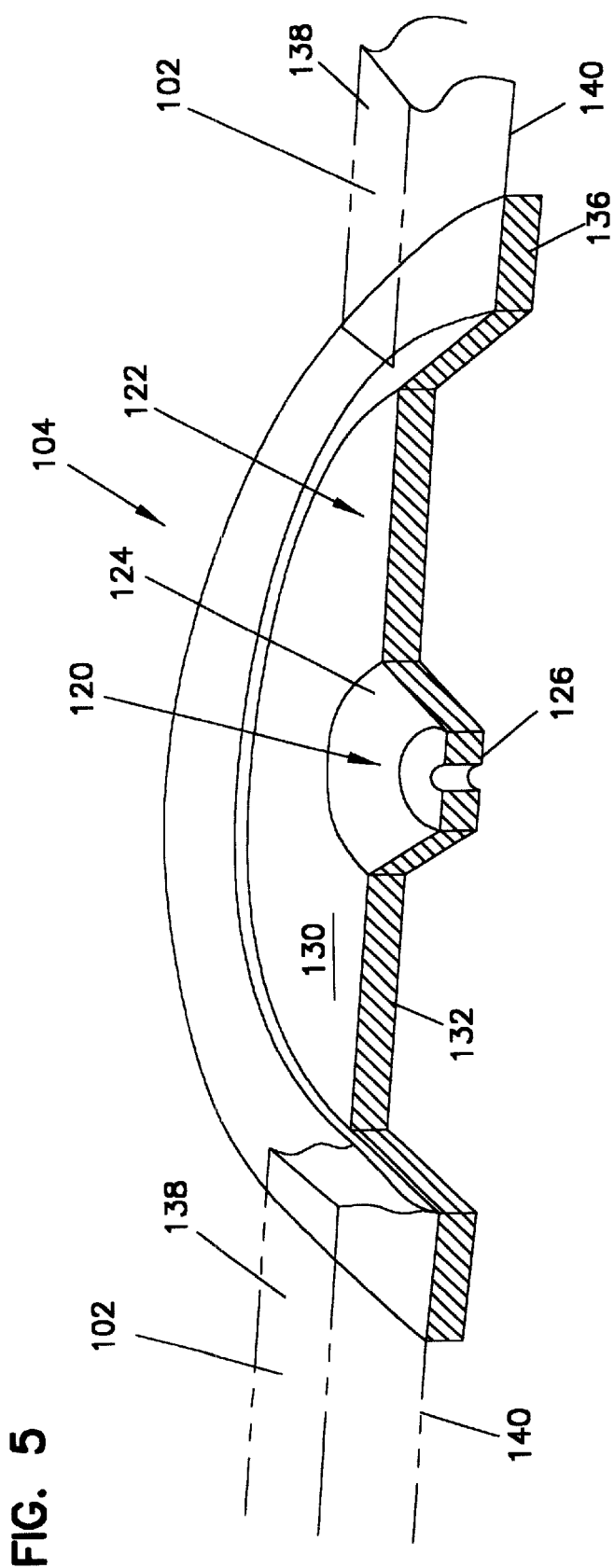
FIG. 5 is a perspective cross-sectional view of the spindle cap shown in FIGS. 3–4.

As shown in FIGS. 4–5, cover plate 102 includes outer and inner surfaces 138, 140. In the embodiment illustrated in FIG. 5, spindle cap 104 is a formed plate having a circumferential raised portion between an outer circumferential portion and an inner circular portion to form the raised inner surface for spindle clearance. Outer portion forms rim 136 and is formed to align with inner surface 140 of cover plate 102 to secure spindle cap 104 to cover plate 102. Rim 136 is secured to cover plate 102 by an adhesive or other fastening means. The raised spindle portion 122 is elevated or spaced a sufficient distance above rim 136 so that outer surface 130 of spindle cap is aligned at or below the form factor height and the inner surface 132 of spindle cap is spaced from the inner portion forming hub portion 120, outer portion forming rim 136 and the inner surface of the cover plate 102 to provide sufficient spindle clearance. Although the embodiment illustrated shows an outer rim 136, alternate embodiments can include alternate structures or flanges to secure spindle cap 104 to cover plate 102.

Figure 6:
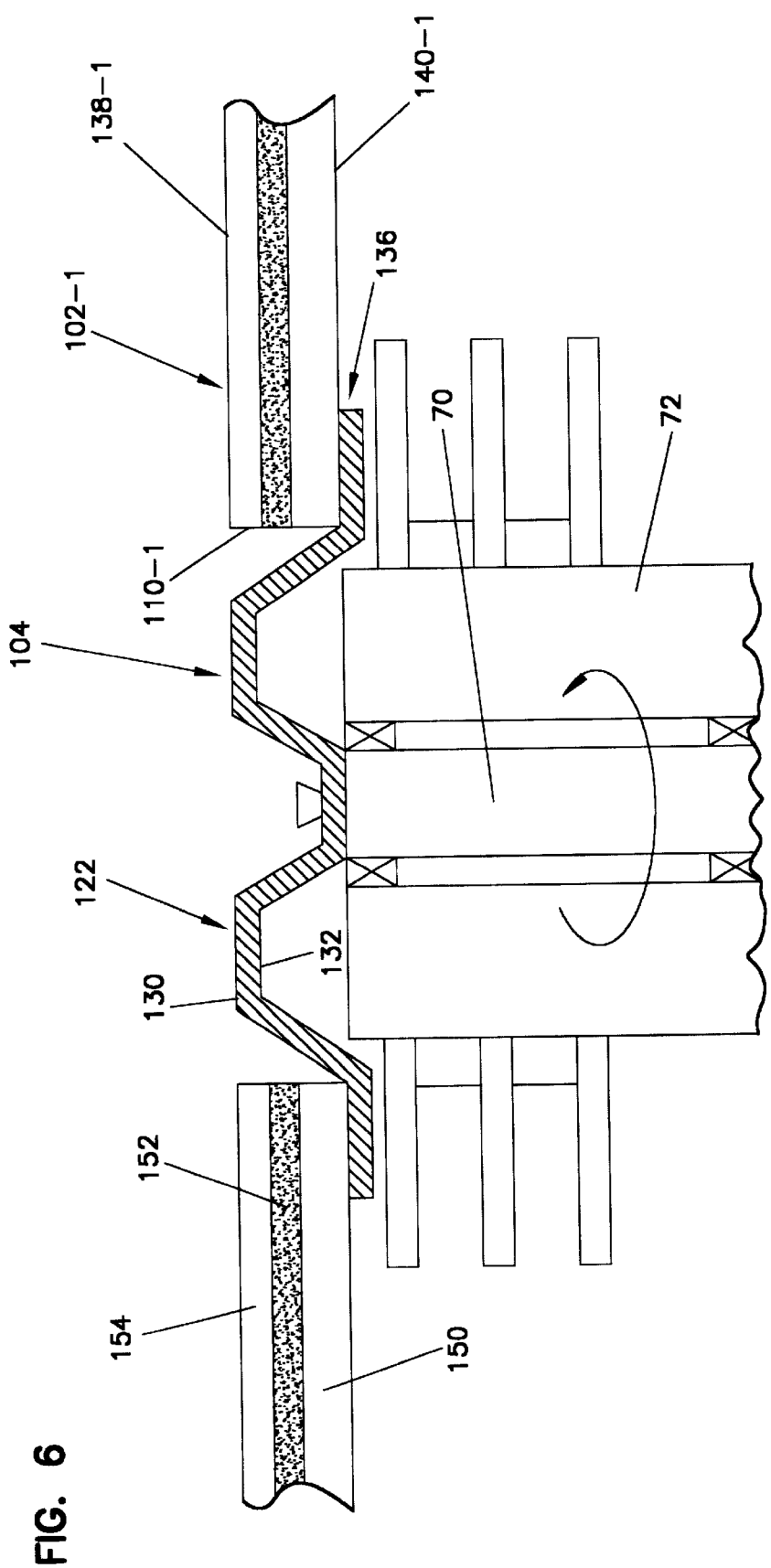
FIG. 6 is a cross-sectional view of an embodiment of a cover including a spindle cap and composite cover plate shown with a spindle motor illustrated diagrammatically.

Acoustic noise and vibration is imparted to housing structures or covers of disc drives by spindle motors or voice coil motors. Vibration imparted by motors can induce vibration at resonance frequencies increasing acoustic noise of a disc drive. FIG. 6 illustrates a composite cover plate 102-1 structure. The composite cover plate 102-1 structure includes a rigid inner layer 150, a damping layer 152 and a rigid outer layer 154. The outer layer 154 is separated from inner layer 150 by damping layer 152 so that outer layer 154 acts as a non-structural "dead mass" that is effectively isolated from the vibration sources by the damping layer 152. In one embodiment, inner and outer rigid layers 150, 154 are formed of a stainless steel material. A suitable damping material is SCOTCHDAMP® available from 3M Company of St. Paul Minn. SCOTCHDAMP® is available with contact adhesives on both surfaces for attachment to the upper and lower layers 150, 154.

The composite cover plate 102-1 increases cover thickness effecting available space for spindle clearance and spindle height for form factor dimensions. In the embodiment shown in FIG. 6, cover plate 102-1 includes spindle cap opening 110-1 closed by spindle cap 104. Rim 136 of spindle cap is secured to an inner surface 140-1 of the cover plate 102-1. The thickness of the spindle portion 122 is smaller than the thickness of the cover plate 102-1 between outer and inner surfaces 138-1, 140-1 and height of the spindle portion is sufficient so that the upper surface 130 of spindle portion 122 is at or below the form factor height and inner surface 132 is raised above the inner surface 140-1 of the cover plate 102-1 to elevate the cover above spindle 72 for sufficient spindle clearance without limiting spindle capacity.

Although a particular composite structure is shown, application is not limited to the specific composite structure shown. For example inner and outer rigid layers 150, 154 can be formed of alternate metal materials such as brass or plated non-stainless steel. Thus, as described, the present invention includes a cover plate 102-1 and spindle cap 104 to provide desired acoustic control without sacrificing form factor spindle capacity or clearance.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a spindle cap for a cover plate, it will be appreciated by those skilled in the art that the teachings of the present invention can be applied to other structural aspects of a housing structure for a disc drive, such as a lower base portion without departing from the scope and spirit of the present invention.

What is claimed is:

1. A disc drive assembly comprising:
   a base chassis;
   a spindle motor including a spindle rotatable relative to a spindle hub secured to the base chassis and the spindle rotationally supporting at least one disc;
   a head facing the at least one disc to read data from or write data to the at least one disc;
   cover coupleable to the base chassis including:
   a multiple layer cover plate having inner and outer surfaces and a spindle opening and the multiple layer cover plate including a damping layer between the inner and outer surfaces of the cover plate; and
   a spindle cap supported in the spindle opening including a fastener opening to secure the spindle hub relative to the spindle cap and the spindle cap including an outer surface aligned at or below the outer surface of the cover plate and a raised inner surface having a raised height elevation spaced from a height elevation of the inner surface of the cover plate for spindle clearance.

2. The disc drive assembly of claim 1 wherein the damping layer is formed of a SCOTCHDAMP® material.

3. The disc drive assembly of claim 1 wherein the cover plate includes an inner layer and an outer layer and the damping layer is between the inner layer and the outer layer.

4. The disc drive assembly of claim 3 wherein the inner and outer layers are formed of a metal material.

5. The disc drive assembly of claim 3 wherein the spindle cap is coupled to the inner layer and the damping layer separates the inner layer from the outer layer.

6. The disc drive assembly of claim 1 wherein the spindle cap includes a spindle portion and a hub portion and the raised inner surface is formed in the spindle portion and the hub portion extends below the raised inner surface of the spindle portion to abut the spindle hub of the spindle motor.

7. The disc drive assembly of claim 6 wherein the fastener opening is formed on the hub portion and is countersunk.

8. The disc drive assembly of claim 1 wherein the spindle cap includes an outer rim.

9. The disc drive of claim 8 wherein the outer rim is secured to the inner surface of the cover plate.

10. The disc drive of claim 8 wherein the spindle cap includes a spindle portion coupled to the outer rim and spaced from the outer rim to form the raised inner surface of the spindle cap spaced from the inner surface of the cover plate.

11. The disc drive of claim 10 wherein the spindle cap is formed of a stamped sheet to form the spindle portion and the outer rim.

12. A housing for a disc drive comprising:
- a base chassis including a recessed cavity adapted to house a spindle motor including a spindle rotatable relative to a spindle hub and a cover coupled to the base chassis and the cover including a composite layer structure to isolate vibration; and
- spindle cover means for coupling the spindle motor relative to the composite layer cover for operation of the spindle motor relative to the composite layer cover.

13. The housing of claim 12 including;
- a fastener means for coupling the spindle hub to the composite layer cover.

14. The housing of claim 12 wherein the spindle cover means is coupled to an inner layer of the composite layer cover and isolated from an outer layer by a damping layer between the inner and outer layers.

15. A disc drive comprising:
- a rigid housing enclosing a spindle motor including a spindle carrying at least one disc rotatable about a spindle hub and the housing including a cover having a multiple layer construction between opposed inner and outer surfaces and a spindle opening;
- a head facing the at least one disc to read data from or write data to the at least one disc;
- a spindle cap in the spindle opening and including opposed inner and outer surfaces, the inner surface of the spindle cap having a raised elevation height spaced from an elevation height of the inner surface of the cover to provide spindle clearance; and
- a fastener securing the spindle hub to the spindle cap.

16. The disc drive of claim 15 wherein the spindle cap includes a rim having an exposed surface coupled to the inner surface of the cover.

17. The disc drive of claim 15 wherein the spindle cap includes a spindle portion and a hub portion and the spindle portion includes the raised inner surface having the raised elevation height to provide spindle clearance and the hub portion includes a lowered inner surface extending below the raised inner surface to abut the spindle hub of the spindle motor.

18. The disc drive of claim 15 wherein the multiple layer construction includes an inner layer, an outer layer and a damping layer therebetween.

19. The disc drive of claim 18 wherein the spindle cap is coupled to the inner layer and the damping layer separates the inner layer from the outer layer.

* * * * *